Patented July 15, 1947

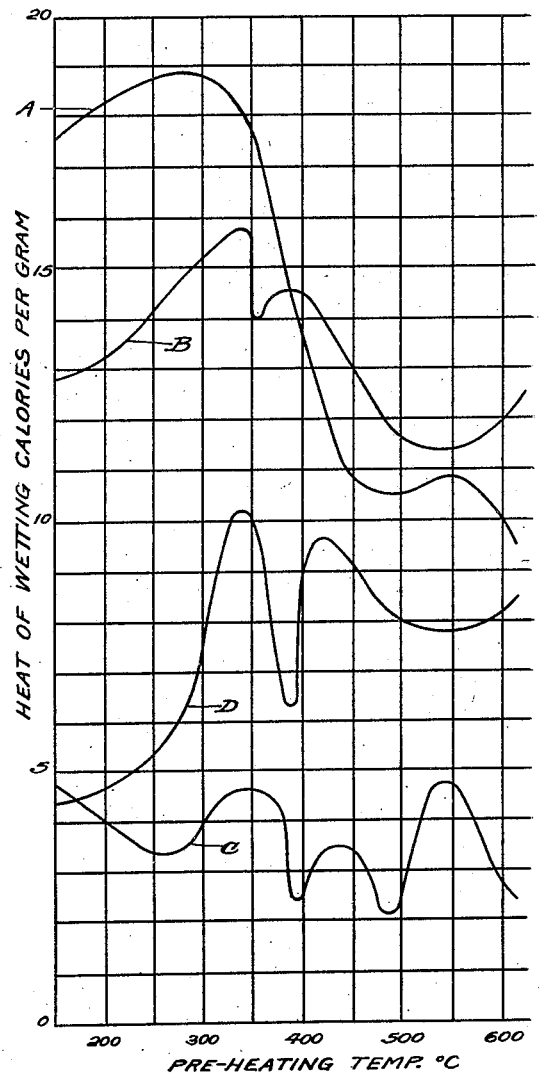

2,424,012

UNITED STATES PATENT OFFICE 2,424,012

MANUFACTURE OF MOLDED ARTICLES FROM COAL

Donald Hugh Bangham, London, John Godolphin Bennett, Kingston-on-Thames, Robert Leslie Brown, Liverpool, Wallace Hirst, Kingston-on-Thames, Marcello Pirani, Kingston Hill, and Rodney Francis Jennings, Richmond, England, assignors to C. D. Patents Limited, Fulham, London, England, a British company Application June 17, 1943, Serial No. 491,238
In Great Britain July 7, 1942

7 Claims. (Cl. 18—55)

It is well known that when heated to temperatures of about 350° C. and upwards coal undergoes destructive distillation, and that certain bituminous coals soften when heated at or near the temperature of the onset of destructive distillation. Destructive distillation is accompanied by intumescence if the environmental conditions, for example, the pressure, are such as to permit a sufficiently rapid disengagement of volatiles within the softened coal substance. As the temperature is increased and destructive distillation proceeds a stage is reached at which the coal ceases to be plastic and becomes coke.

Hitherto this softening property has been utilized exclusively, on the one hand, in the manufacture of briquettes and, on the other hand, in connection with the carbonization process with a view to better control of the process and the production of cokes having desired properties.

It is an object of the present invention to manufacture from coal moulded articles which are fundamentally different in their nature and properties both from briquettes and from cokes, and which, by reason of their excellent physical properties and resistance to chemicals and of the ready availability of the raw material, have wide and valuable applications in industry.

According to the present invention, a process of producing shaped articles useful in industry, comprises, finely comminuting bituminous coal having a content of volatile matter between 13 and 42 per cent calculated on the dry ashfree coal, and subjecting the same, preferably without the addition of any softening or binding agent, in a mould to a pressure of at least about 250 atmospheres at a temperature which is at least about 300° C. and under the pressure used lies between the temperature at which the coal begins to soften and that at which it ceases to be plastic, and which also is below the temperature of the onset of intumescence under the pressure used, maintaining such pressure and temperature until the material has agglutinated and the desired article is formed, releasing the pressure and cooling the article.

The effect of using a high pressure of at least about 250 atmospheres, for example, 250–600 atmospheres, is to produce or widen a temperature range between the beginning of plasticity and the onset of intumescence, by causing intumescence to begin at a somewhat higher temperature than is the case when the coal is heated at atmospheric or other low pressure; and also to make the coal flow more readily. The range of moulding temperatures can be further widened by observing certain conditions hereinafter described which further raise the temperature of the onset of intumescence.

The coals used in the invention have, as stated above, a content of volatile matter ranging from 13 to 42 per cent. (calculated on the dry ash-free coal), which corresponds with a carbon content ranging from 92 to 77 per cent. Among the aforesaid coals there may be used, if desired, those selected by the following test, which we have devised for the purpose and which we call the "heat of wetting" test:

Weighed samples of a coal which has been ground to pass a 72 mesh B. S. S. sieve are heated in an inert atmosphere at a series of temperatures between, say, 200° C. and 600° C. The rate at which each sample is heated up to the selected temperature should not exceed 5° C. per minute, and the period of heating at the said temperature is 2 hours. Each sample is placed in a small thin glass bulb which is then evacuated to $10^{-3}$ to $10^{-4}$ mm. of mercury at 70–90° C. until the coal is free from occluded gas, and the bulb is sealed off. The bulb is placed in a glass Dewar vessel with a measured quantity of absolute methyl alcohol sufficient to prevent the coal from coming into contact with air during the test. The bulb is then broken, and the rise in temperature is measured. The calorimetric contents of the apparatus having been determined by known methods, the heat in calories generated by the wetting of 1 gram of the coal with methyl alcohol is calculated. The heat so generated is herein referred to as the heat of wetting.

The accompanying drawing shows the curves obtained by plotting the heats of wetting against the temperature of pre-heating of samples of four different coals marked A to D.

These coals are

A. Northumberland (Ellington High Main), medium caking, content of volatile matter=37 per cent.

B. Yorkshire (Denaby), strongly caking, content of volatile matter=36 per cent.

C. Kent (Tilmanstone), strongly caking, content of volatile matter=27 per cent.

D. Forest of Dean (High Delf) strongly caking, content of volatile matter=41 per cent.

The above contents of volatile matter, and all those elsewhere referred to herein, are calculated on the dry ash-free coal.

It will be seen that in each case there is a marked fall in the heat of wetting between 300° C. and 400° C.

The micellar structure of coals is related to their heat of wetting by methyl alcohol, and any bituminous coal of the aforesaid kind which shows a marked fall in the heat of wetting at preheating temperatures ranging from 300° C. to 400° C. is especially advantageous for moulding in accordance with the invention. Among the coals so selected there are particularly suitable those for which this marked fall in the heat of wetting occurs at a preheating temperature below the temperature at which the coal, when heated under atmospheric pressure for 2 hours in an inert atmosphere, loses 3.5 per cent. of volatile matter, for example, a change from 34 per cent. of volatile matter originally present to 30.5 per cent. after the heat treatment. It is necessary that the rate at which the coal is heated up to the latter temperature should not exceed 5° C. per minute.

The coal must be comminuted to a very fine state of division in order to achieve successful moulding, and we prefer to comminute the coal until at least 30 per cent. thereof has a particle size not exceeding $10\mu$. Thus, for example, while a Yorkshire coal having a content of volatile matter of 36 per cent. and ground to pass a 100 mesh B. S. S. sieve but containing less than 30 per cent., say about 5 per cent., of particles not exceeding $10\mu$, was capable of being moulded at 345° C. under a pressure of 300–450 atmospheres, a much improved product was obtained after comminuting the coal so that 50 per cent. thereof had a particle size not exceeding $10\mu$. Preferably, also, the comminuted coal should be graded as to particle size so as to secure, in accordance with known principles, a high degree of close packing. It is to be understood that all the references herein to particle size mean the particle size as determined by means of a photoelectric sedimentometer.

The pressure at which the moulding is carried out may range, for example, from 300 to 450 atmospheres, but a higher or somewhat lower pressure may be employed. It is exceptional for good results to be obtained below about 250 atmospheres.

The preferred range of temperature within which, under the moulding pressure used, a coal selected by the heat of wetting test is moulded begins at about the temperature at which the fall in heat of wetting occurs and ends near the temperature at which the coal loses 3.5 per cent. of volatile matter when heated under atmospheric pressure for 2 hours in an inert atmosphere in the manner described above.

At stated above it is possible by observing certain conditions to raise still further the temperature of the onset of intumescence. Thus, by incorporating an absorbent filler with the coal powder volatiles can be assimilated so that the temperature of the onset of intumescence is raised. In this way the upper limit of the moulding temperature range can be appreciably raised.

We have also found that the temperature of the onset of intumescence can be further raised, and the range of moulding temperatures of the selected coals can be considerably extended upwards, by first subjecting the finely divided coal to a moderately high pressure, for example, 50 to 150 atmospheres, while the coal is being heated to the moulding temperature, and then subjecting it to the full moulding pressure, for example, 300 to 450 atmospheres, at the moulding temperature. Thus, for example, the moulding temperature range of the Yorkshire coal above mentioned was found to be 345°–350° C. when moulded under a pressure of 300–450 atmospheres directly applied; but when a pressure of 150 atmospheres was applied while the coal was being heated to the moulding temperature the coal could be heated at that pressure to a temperature between 345° C. and 375° C. and moulding completed under 300–450 atmospheres pressure. The products obtained at or near the upper limit of the extended temperature range have a shinier and better appearance than those made by moulding directly at the full moulding pressure. The temperature of the onset of intumescence can also be raised, and similarly improved products obtained, if the mould is occasionally "breathed" by releasing the pressure at least once during the moulding operation or by de-gassing the coal by a preliminary heat treatment, if desired under reduced pressure, at a temperature below the moulding range.

In the production of large mouldings the adoption of one or more of the expedients described above for raising the temperature at which intumescence occurs is especially recommended.

It is known that when coal is heated at a temperature at which it is plastic initially and maintained at that temperature for long periods, for example several days, it may cease to be plastic. It will be understood, however, that for determining the temperature at which plasticity ceases for the purposes of this invention only such times of heating are contemplated as are required for moulding, which is generally a matter of minutes or at most a few hours.

The articles moulded from coal alone in accordance with the invention are homogeneous to the eye, have good electrical insulating properties, have a conchoidal fracture, and a shiny black surface, do not produce a black streak when rubbed on paper, and are substantially unaffected by boiling toluene. They are thus characteristically different, on the one hand, from self-bonded briquettes, which are dull and granular, produce a black streak when rubbed on paper, and disintegrate in boiling toluene; and, on the other hand, from cokes which are dull and have undergone chemical decomposition.

The moulded articles made by the invention from coal alone have a fairly good tensile strength, a dielectric constant, in general, of the order of 4, and withstand prolonged contact with acids or alkalies, such, for example, as hydrochloric acid, hydrofluoric acid, acetic acid, or solutions of caustic alkali, even when the acids or alkalies are at boiling temperature.

The comminuted coal may be moulded with the addition of granular or fibrous filling materials. Such materials are, for example, fibrous organic materials, minerals, metals or powdered coke, and must be such as not to be rendered ineffective by the conditions of temperature, pressure and gaseous atmosphere under which the moulding is carried out. The addition of asbestos (powder or fibre), steel filings, fine steel wool, powdered ferrosilicon, quartz meal or aluminum powder reinforces the products and prevents shrinkage cracks. In some cases it is advantageous to use as a filler finely ground electrode carbon. Such a filler is very suitable when a wholly carbon structure is desired in the moulded article. In all cases the filling materials are preferably dried before incorporating them with the finely divided coal. Mixtures of two or more of the above filling materials may be used.

Control both of the absolute particle size and of the size distribution of the coal and of the filler, which latter should preferably be in a finely divided form such that at least 30 per cent thereof by weight does not exceed 10μ in particle size, contributes to the uniformity and strength of the product. For example, it has been found particularly advantageous to use coal ground to a particle size such that 50 per cent is smaller than 10μ in conjunction with asbestos fibre or in conjunction with alumina ground to a fineness such that 30 per cent is smaller than 10μ, and graded as to particle size so as to secure a high degree of close packing.

The relative proportions of coal and filler may be varied as may be required; usually the filler will constitute from 5 to 60 per cent by weight of the mixture to be moulded. For high mechanical strength a mixture of 60 parts by weight of coal with 20 parts of asbestos and 20 parts of alumina has been found suitable. In the case of fillers of low chemical resistance a relatively low proportion of filler is preferred, for example, 95 parts of coal with 5 parts of alumina.

As an absorbent filler for the purpose of assimilating volatiles as described above there may be used powdered coke or a powdered coal which does not soften or undergo destructive distillation at the moulding temperature, for example, a coal of anthracite origin. Instead of such a coal or coke, finely divided inorganic materials of a highly porous and absorbent character, such as colloidal silica or colloidal alumina, may be used. Should a product moulded from such a blend not have the mechanical properties required this can be corrected by the addition of reinforcing filing materials as already described.

The moulding operation may be carried out in a moulding press capable of a maximum working pressure of the order of 50 tons and heated electrically or by hot gas or vapour, such as the vapour of an organic liquid of suitable boiling point, which vapour may be under pressure, if desired.

The following examples illustrate the invention, the parts being by weight:

Example 1

Northumberland (Ellington High Main) coal having a content of volatile matter of 37 per cent (calculated on the dry ash-free coal) is ground and graded to give a substantially uniform distribution of the following particle sizes:

100 per cent of the coal less than 53μ
    90.1 per cent of the coal less than 40μ
    80.5 per cent of the coal less than 20μ
    50.8 per cent of the coal less than 10μ
    15.6 per cent of the coal less than 5μ
    1.8 per cent of the coal less than 2μ

The particle sizes are those determined by means of a photo-electric sedimentometer.

200 grams of the ground coal are placed in a 5 inch disc mould, which has previously been thoroughly cleansed and polished, and which is insulated at the sides by means of an electric heating collar to prevent excessive heat losses. The mould is then closed and placed between the platens of a 50 ton press. The platens are electrically heated, and the temperature of the charge is regulated by means of a thermostat controlled by a thermo-couple disposed in the mould. The charge is subjected to a pressure of 100 atmospheres and heated to a temperature between 345° C. and 375° C. When the desired temperature, for example 360° C., is reached, or after heating for 5 minutes if the said temperature is reached in less than that time, a full moulding pressure of 450 atmospheres is applied, and this pressure is maintained for a period of 20 minutes. The pressure is then released, and the moulded article is immediately ejected from the mould and allowed to cool slowly.

The moulded article is black and has a shiny surface. It does not produce a black streak when rubbed on paper. It exhibits a conchoidal fracture with a shiny surface and does not disintegrate in boiling toluene.

Example 2

The procedure is the same as in Example 1, except that the preliminary pressing at 100 atmospheres is omitted and the full pressure of 450 atmospheres is applied immediately. During the period of heating up and moulding the mould is "breathed" by releasing the pressure several times, thereby permitting the gases evolved to escape from the charge.

Example 3

60 parts of the ground coal described in Example 1 are well mixed in an edge runner mill for about 15 minutes with 40 parts of a fused alumina which has been ground to pass a 200 B. S. S. mesh sieve. 200 grams of the mixture are moulded under pressure in a 5 inch disc mould by the same procedure as that described in Example 1.

The moulded article is black but its surface is not so shiny as that of the product of Example 1. It does not produce a black streak when rubbed on paper. It exhibits a conchoidal fracture and does not disintegrate in boiling toluene. The product is of better mechanical strength than the product of Example 1.

Example 4

80 parts of the ground coal described in Example 1 are mixed with 20 parts of asbestos fibre in an edge runner mill until the fibre is uniformly distributed throughout the mass. Prior to the mixing operation the asbestos fibre is thoroughly dried at 110° C., and shredded into ½ inch lengths. The mixture is then moulded by the procedure described in Example 1.

The moulded article is black and has a shiny surface on which the asbestos fibres are faintly visible. Its other properties are the same as those mentioned for the product of Example 1, but in addition it is of better mechanical strength.

Example 5

60 parts of the ground coal described in Example 1, 20 parts of fused alumina ground to pass a 200 B. S. S. mesh sieve and 20 parts of asbestos fibre (previously dried and shredded as in Example 4) are mixed together in an edge runner mill until a uniform mixture is obtained. The mixture is then moulded by the procedure described in Example 1.

The moulded article is similar in its properties to the product of Example 4, but has considerably greater mechanical strength.

In the above examples the ground coal or the mixture of coal and filler, instead of being introduced into the mould in loose form, may first be formed by compression at atmospheric temperature into pellets of suitable shape to fit the mould.

We claim:
1. The process of producing shaped articles useful in industry, which comprises, finely comminuting bituminous coal having a content of volatile matter between 13 and 42 per cent, cal- culated on the dry ash-free coal, and subjecting the same, without addition of any softening or binding agent, in a mould to a pressure of at least about 250 atmospheres at a temperature which is at least about 300° C. and under the pressure used lies between the temperature at which the coal begins to soften and that at which it ceases to be plastic, and which also is below the temperature of the onset of intumescence under the pressure used, maintaining such pressure and temperature until the material has agglutinated and the desired article is formed, releasing the pressure and cooling the article.

2. The process of producing shaped articles useful in industry which comprises, finely comminuting bituminous coal having a content of volatile matter between 13 and 42 per cent. calculated on the dry ash-free coal and subjecting the same in a mould to a pressure of at least about 250 atmospheres at a temperature which is at least about 300° C. and under the pressure used lies between the temperature at which the coal begins to soften and that at which it ceases to be plastic, and which also is below the temperature of the onset of intumescence under the pressure used, maintaining such pressure and temperature until the material has agglutinated and the desired article is formed, releasing the pressure and cooling the article.

3. The process of producing shaped articles useful in industry, which comprises, finely comminuting bituminous coal having a content of volatile matter between 13 and 42 per cent. calculated on the dry ash-free coal, mixing therewith a comminuted inert absorbent filling material, adapted to assimilate volatiles and which does not soften or undergo destructive distillation at the moulding temperature used, subjecting the mixture, without addition of any softening or binding agent, in a mould to a pressure of at least about 250 atmospheres at a temperature which is at least about 300° C. and under the pressure used lies between the temperature at which the coal begins to soften and that at which it ceases to be plastic, and which also is below the temperature of the onset of intumescence under the pressure used, maintaining such pressure and temperature until the material has agglutinated and the desired article is formed, releasing the pressure, and cooling the article.

4. The process of producing shaped articles useful in industry which comprises, finely comminuting bituminous coal having a content of volatile matter between 13 and 42 per cent. calculated on the dry ash-free coal, subjecting the same, without addition of any softening or binding agent, in a mould, to a pressure of from about 50 to 150 atmospheres while heating progressively up to a desired moulding temperature for a few minutes, thereupon raising the pressure to at least about 250 atmospheres while maintaining a moulding temperature which is at least about 300° C. and is within the range in which the coal is plastic but below the temperature at which, after the stated preliminary treatment and at the pressure used, intumescence takes place, maintaining such pressure and temperature until the material has agglutinated and the desired article is formed, releasing the pressure and cooling the article.

5. The process of producing shaped articles useful in industry which comprises, finely comminuting bituminous coal having a content of volatile matter between 13 and 42 per cent. calculated on the dry ash-free coal until at least 30 per cent. of the coal has a particle size not exceeding $10\mu$, and subjecting the same, without addition of any softening or binding agent, in a mould to a pressure of at least about 250 atmospheres at a temperature which is at least about 300° C. and under the pressure used lies between the temperature at which the coal begins to soften and that at which it ceases to be plastic, and which also is below the temperature of the onset of intumescence under the pressure used, maintaining such pressure and temperature until the material has agglutinated and the desired article is formed, releasing the pressure and cooling the article.

6. As a new article of manufacture, coherent moulded articles made substantially wholly from bituminous coal having a content of volatile matter between 13 and 42 per cent. calculated on the dry ash-free coal, the coherence thereof being due to the moulded coal itself which articles appear homogeneous to the eye, have good electric insulating properties, have a conchoidal fracture, and a shiny black surface, do not produce a black streak when rubbed on paper, withstand prolonged contact with boiling hydrochloric, hydrofluoric or acetic acids or solutions of caustic alkali and are substantially unaffected by boiling toluene.

7. As a new article of manufacture, moulded articles made predominantly from bituminous coal having a content of volatile matter between 13 and 42 per cent. calculated on the dry ash-free coal and a filling material, which articles contain the filling material within a coal matrix constituting a binding agent for the filling material, and which appear homogeneous to the eye, have good mechanical strength, a conchoidal fracture, and a shiny surface, do not produce a black streak when rubbed on paper, withstand prolonged contact with boiling hydrochloric, hydrofluoric or acetic acids or solutions of caustic alkali, and are substantially unaffected by boiling toluene.

DONALD HUGH BANGHAM.
JOHN GODOLPHIN BENNETT.
ROBERT LESLIE BROWN.
WALLACE HIRST.
MARCELLO PIRANI.
RODNEY FRANCIS JENNINGS.

REFERENCES CITED

The following references are of record in the file of this patent:

UNITED STATES PATENTS

| Number | Name | Date |
| --- | --- | --- |
| 1,559,275 | Myler | Oct. 27, 1925 |
| 1,761,318 | Thompson | June 3, 1930 |
| 1,866,287 | Blume | July 5, 1932 |
| 2,026,767 | Alley | Jan. 7, 1936 |
| 2,092,502 | Ellis | Sept. 7, 1937 |
| 2,146,532 | Crane et al. | Feb. 7, 1939 |
| 2,079,343 | Fischer et al. | May 4, 1937 |
| 1,891,893 | Spengler et al. | Dec. 20, 1932 |
| 905,693 | Griffin | Dec. 1, 1908 |
| 2,114,121 | Bender | Apr. 12, 1938 |
| 2,230,654 | Plunkett | Feb. 4, 1941 |